(12) United States Patent  
Yamasaki

(10) Patent No.: US 7,357,438 B2  
(45) Date of Patent: Apr. 15, 2008

(54) DEVICE FOR ATTACHING AND REMOVING A COMPONENT TO AND FROM A VEHICLE

(75) Inventor: Shigeto Yamasaki, Shizuoka-ken (JP)

(73) Assignee: Yamaha Hatsudoki Kabushiki Kaisha, Shizuoka-Ken (JP)

( * ) Notice: Subject to any disclaimer, the term of this patent is extended or adjusted under 35 U.S.C. 154(b) by 230 days.

(21) Appl. No.: 11/022,051

(22) Filed: Dec. 23, 2004

(65) Prior Publication Data

US 2005/0140162 A1    Jun. 30, 2005

(30) Foreign Application Priority Data

Dec. 26, 2003   (JP) .............................. 2003-434402

(51) Int. Cl.
*B62J 17/00* (2006.01)

(52) U.S. Cl. .................................................. 296/78.1

(58) Field of Classification Search ............... 296/78.1, 296/89, 191
See application file for complete search history.

(56) References Cited

U.S. PATENT DOCUMENTS 4,830,423 A * 5/1989 Nebu et al. ................. 296/78.1
5,857,727 A * 1/1999 Vetter ........................ 296/78.1

* cited by examiner

*Primary Examiner*—Joseph D Pape
(74) *Attorney, Agent, or Firm*—Hogan & Hartson LLP

(57) ABSTRACT

A device for attaching and removing a component to and from a vehicle includes a vehicle main body, a component of a generally flat shape and a locking device capable of attaching the component to the vehicle main body by moving the component in one direction relative to the vehicle main body. The one direction is made to be one along a flat outer surface of the component.

17 Claims, 5 Drawing Sheets

DEVICE FOR ATTACHING AND REMOVING A COMPONENT TO AND FROM A VEHICLE

BACKGROUND OF THE INVENTION

1. Field of the Invention

This invention relates to a device that makes it possible to attach and remove a vehicle component of a generally flat shape, such as a windshield of a vehicle, such as a motorcycle, to and from a vehicle main body, such as a vehicle body.

2. Description Related Art

As the device for attaching and removing a vehicle component to and from the vehicle, conventionally, the vehicle is a motorcycle provided with a vehicle main body or a vehicle body of the motorcycle, a generally flat-shaped component or a windshield, and a locking device for removably attaching the windshield to the vehicle body.

The locking device is provided with an engage-stopping member that removably engage-stops the lower end of the windshield to the vehicle body and permits the windshield to turn back and forth about the engage-stopping member, and a locking member that removably attaches the middle portion in height of the windshield to the vehicle body when the windshield is turned backward.

To do the work for attaching the windshield to the vehicle body using the locking device, first the lower end of the windshield is engage-stopped with the vehicle body using the engage-stopping member. Next the windshield is turned backward about the engage-stopping member. Then, as interlocked with the turn of the windshield, the middle portion of the windshield is attached to the vehicle body with the locking member. In this way, the windshield is attached to the vehicle body, or the attaching work is over.

The conventional device described above has the following problems.

The first problem is that when the windshield is to be attached to the vehicle body as described above, first the lower end of the windshield is engage-stopped with the vehicle body using an engage-stopping member followed by turning the windshield backward about the engage-stopping member. Because the direction of the turn intersects with the flat outer surface of the windshield nearly at right angles or in the thickness direction of the windshield, the locus of the windshield turning in that direction occupies a large space. Consequently, the work for attaching the windshield to the vehicle body requires a large space.

However, in vehicles like the motorcycle, generally the components are laid out compactly and only little surplus space is left. Therefore, it is not easy to take a large space for the attaching work and the components might stand in the way of the attaching work, which might make the attaching work cumbersome.

Besides, while the attaching work first requires that the lower end of the windshield be engage-stopped with the vehicle body using the engage-stopping member, the large size and heavy weight of the windshield makes positioning of the windshield to the engage-stopping member less easy in an attempt to lift the windshield and engage-stop its lower end. Accordingly, the attaching work might become further cumbersome.

The second problem is that according to the prior art, the engage-stopping member of the locking device is positioned in the lower part of the windshield and easily visible from the front, which is undesirable because it detracts from the appearance of the motorcycle.

SUMMARY OF THE INVENTION

This invention has been made in view of the above circumstances. Therefore it is an advantage of the present invention to facilitate the work for attaching a vehicle component of a generally flat shape to a vehicle main body and to facilitate also the work for removing the component from the vehicle main body.

Another advantage of the present invention is to improve the appearance of the vehicle.

According to an embodiment of the present invention, a vehicle is provided with a vehicle main body, a component of a generally flat shape, and a locking device capable of attaching the component to the vehicle main body by moving the component in one direction A relative to the vehicle main body. The one direction A is made to be a direction along the flat outer surface of the component. The one direction A is one that is directed downward.

The locking device is provided with a locking mechanism for attaching the component to the vehicle main body and with an operation member coupled to the locking mechanism and attaching with the locking device is released by the operation made to the operation member, and the operation member is located near the outer edge portion of the component.

The outer end edge of the outer edge portion of the component in the vicinity of the operation member is curved in a front view of the component so that the outer end edge of the outer edge portion surrounds the operation member from outside the component.

The operation member, when operated, approaches (C) the outer edge portion of the component.

A guiding device is provided to guide the component so that the component moves in the one direction A.

The guiding device is provided with a slide receiving portion formed on the vehicle main body and with a sliding portion formed on the component and slidable relative to the slide receiving portion, so that the component moves in the one direction A as the sliding portion slides relative to the slide receiving portion.

The locking device is almost entirely covered from its front with the component.

The vehicle is one of a straddling type, the vehicle main body is the vehicle body of the vehicle, and the component is a windshield and the front fork of the vehicle body is covered from its front with the windshield. The windshield is attached to the front fork with the locking device, and the one direction A is made to be one along the longitudinal direction of the front fork.

The effects provided with this invention are as follows.

An embodiment of the present invention includes a vehicle provided with a vehicle main body, a component of a generally flat shape, and a locking device capable of attaching the component to the vehicle main body by moving the component in one direction relative to the vehicle main body. The one direction is made to be the direction along the flat outer surface of the component.

As described above, when the component is moved in the one direction during the work for attaching the component to the vehicle main body, the one direction is made to be the direction along the flat outer surface of the component. Therefore, a small space suffices to be occupied with the locus of motion of the component. Consequently, while vehicles in general have only small, limited surplus space due to a compact layout of components, in proportion to the reduction in the space to be occupied as described above, also a small space suffices for the attaching work. This prevents other components from standing in the way of the attaching work, so that the component attaching work is facilitated.

According to an embodiment of the present invention, the one direction A is a direction that is directed downward. Therefore, the moving direction of the component when it is attached nearly agrees with the direction of the weight of the component itself. Therefore, in comparison with a case in which the one direction is one directed upward, the work for attaching the component is made easier.

The locking device is provided with a locking mechanism for attaching the component to the vehicle main body and with an operation member coupled to the locking mechanism, so that attaching with the locking device is released by the operation made to the operation member, and the operation member is located near the outer edge portion of the component.

Therefore, the operation member is prevented from largely projecting outward of the component by a great dimension, the component and the operation member are located close to each other, and the vehicle is prevented from becoming large-sized.

When the work for removing the component, attached to the vehicle main body using the locking device, from the vehicle main body is to be done, for example the outer edge portion of the component is gripped by a hand and operation on the operation member of the locking device is done by fingers of the hand. In this way the component attached to the vehicle main body using the locking device is released. Therefore, the work for removing the component is facilitated in comparison with a case in which gripping the component is done separately from operating the operation member of the locking device.

The outer end edge of the outer edge portion of the component in the vicinity of the operation member is curved in a front view of the component so that the outer end edge of the outer edge portion surrounds the operation member from outside the component.

Therefore, the outer edge portion of the component near the operation member with its curvature is shaped convex facing outward. Therefore, when the outer edge portion of the component is gripped by hand in an attempt to remove the component, having been attached to the vehicle main body using the locking device, from the vehicle main body by operating the operation member, at least part of the convex shaped portion of the outer edge portion fits into the palm so that the component is supported by the grip more securely. As a result, the work for removing the component from the vehicle main body is further facilitated.

The operation member, when operated, approaches the outer edge portion of the component. Therefore, when doing the work for removing the component from the vehicle main body, when operating the operation member of the locking device by fingers of the hand while gripping the outer edge portion of the component, the operation may be done so that the operation member moves to approach the outer edge portion. This operation, in view of the motion of fingers, is easier than a motion of the operation member moving apart from the outer edge portion, opposite the approaching motion. Accordingly the work for removing the component is facilitated.

A guiding device is provided to guide the component so that it moves in the one direction. Therefore, it is easy to move the component in the one direction A and fasten it to the vehicle main body in the attaching work for the component by the function of the guiding device. Accordingly the work for attaching the component is facilitated.

The guiding device is provided with a slide receiving portion formed on the vehicle main body and with a sliding portion formed on the component and slidable relative to the slide receiving portion, so that the component moves in the one direction as the sliding portion slides relative to the slide receiving portion.

Therefore, when the component is to be moved in the one direction for the component attaching work, first, once the sliding portion of the component is brought into contact with the slide receiving portion of the vehicle main body, the positioning of the component is done very easily in the beginning of the attaching work. Next, once the sliding portion is made to slide relative to the slide receiving portion, the component moves in the one direction and is attached to the vehicle main body with the locking device. Therefore, the work for attaching the component can be made in simple steps of first bringing the sliding portion into contact with the slide receiving portion so that the component is positioned on the vehicle main body followed by sliding the sliding portion relative to the slide receiving portion. Accordingly the work for attaching the component is further facilitated.

The locking device is almost entirely covered from its front with the component. Therefore, the locking device is prevented from easily being seen in appearance from the front of the vehicle with the component. Accordingly the appearance of the vehicle is improved.

According to an embodiment of the present invention, the vehicle is one of a straddling type, the vehicle main body is the vehicle body of the vehicle, and the component is a windshield. The front fork of the vehicle body is covered from its front with the windshield, the windshield is attached to the front fork with the locking device, and the one direction is made to be one along the longitudinal direction of the front fork.

Therefore, the above effects are obtained with the straddling type of vehicle. The effects are especially beneficial to the straddling type of vehicle including the vehicle main body having a long-sized front fork and others and various other components such as a headlamp, all in a compact layout, with little surplus space left, and with much importance attached to its appearance.

DETAILED DESCRIPTION OF THE INVENTION

Concerning the device for attaching and removing a component to and from the vehicle according to the present invention, when the work for attaching the vehicle component of a generally flat shape to the vehicle main body is to be done, the best mode of embodying the present invention for accomplishing an advantage is to facilitate the component attaching work along with the component removal work, is as follows.

That is to say, the vehicle is provided with a vehicle main body, a component of a generally flat shape, and a locking device capable of attaching the component to the vehicle main body by moving the component in one direction relative to the vehicle main body. The one direction is made to be one along the flat outer surface of the component.

To describe the invention more in detail, its embodiment is described in reference to appended drawings.

Figure 1:
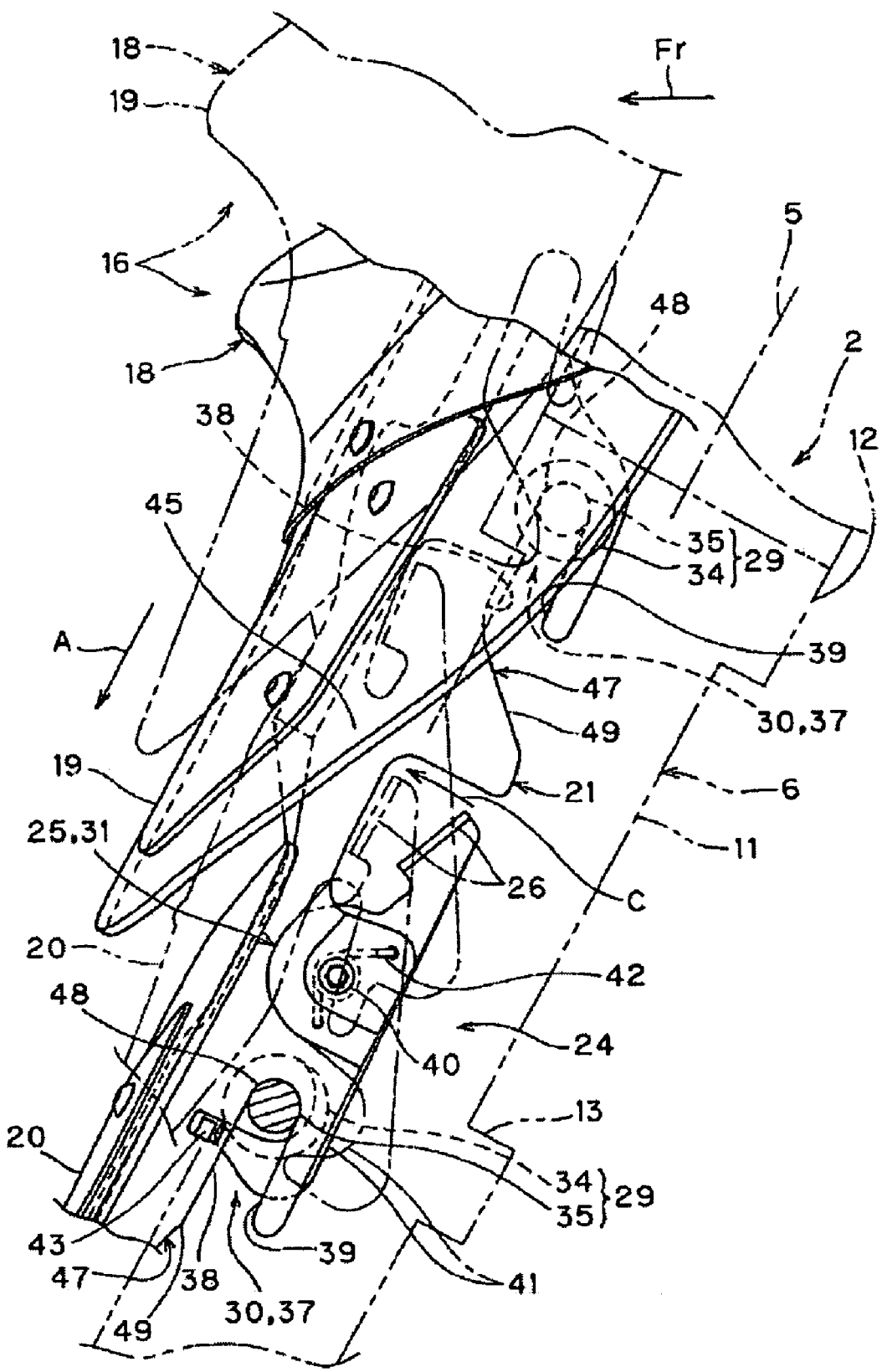
FIG. 1 is an enlarged partial view of a vehicle.
Figure 2:
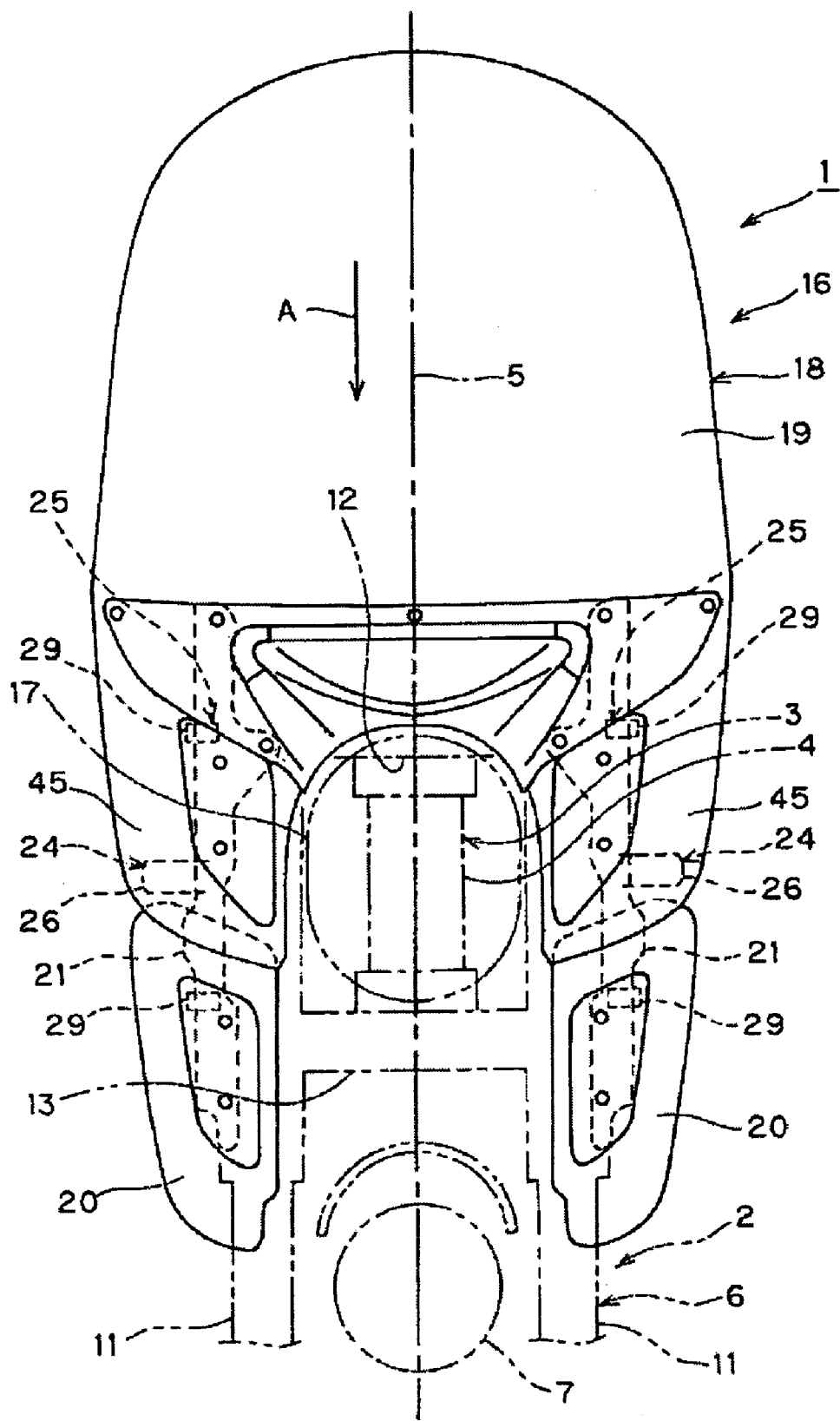
FIG. 2 is a partial front view of the vehicle.
Figure 3:
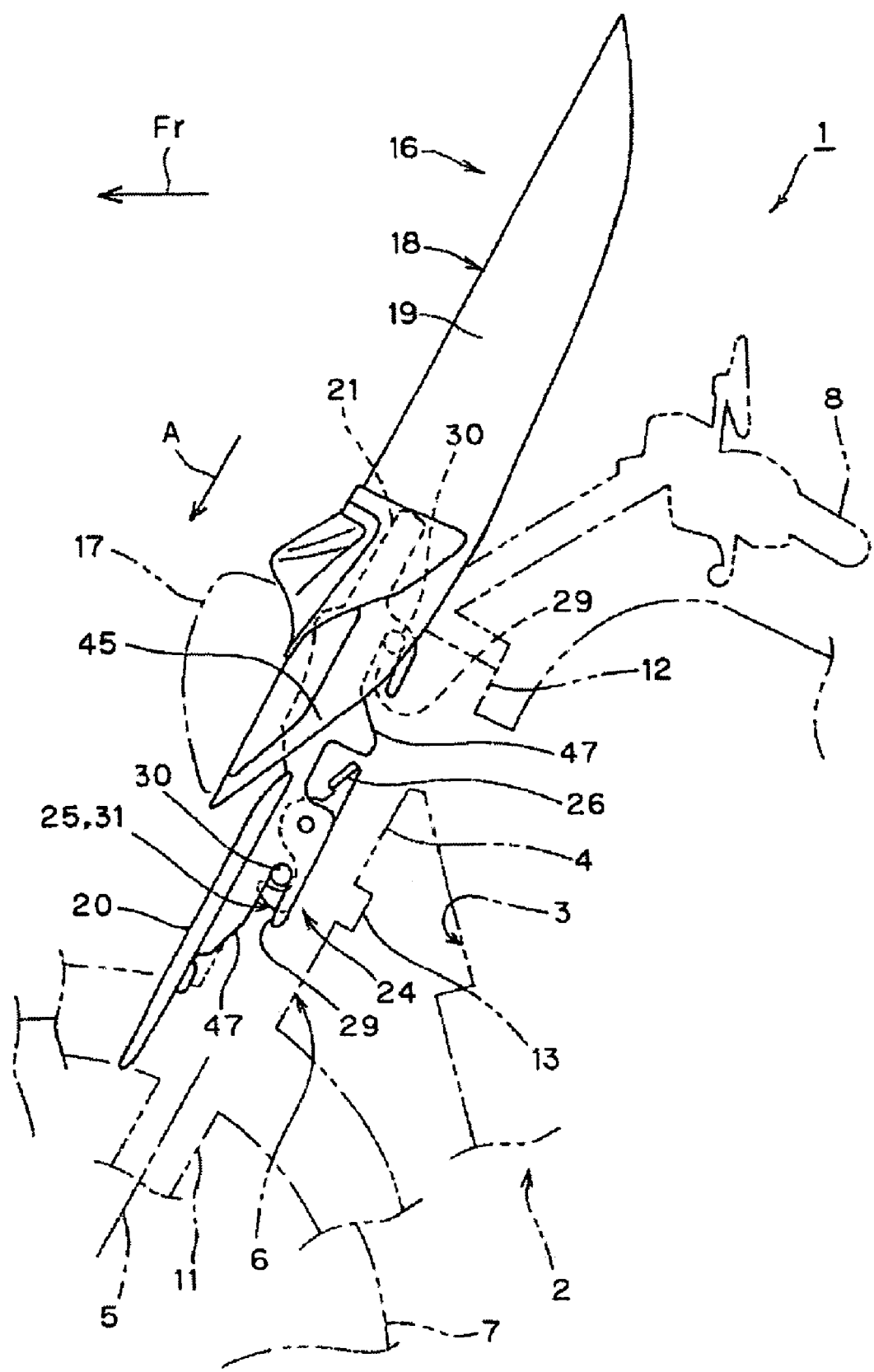
FIG. 3 is a partial side view of the vehicle.

In FIGS. 1 and 2, the reference numeral 1 denotes a vehicle, specifically a straddling type of vehicle, a motorcycle. The arrow Fr indicates a forward, advancing direction of the vehicle 1. The terms right and left as used herein refer to the direction of the width of the vehicle 1.

The vehicle main body 2 of the vehicle 1 is specifically a vehicle body of a motorcycle. The vehicle main body 2 includes a vehicle body frame 3 forming a framework of the vehicle body, a front fork 6 supported to be steered about an axis 5 extending down forward from a head pipe 4 forming a front upper end portion of the vehicle body frame 3, a front wheel 7 supported with the lower end portion of the front fork 6, and handlebars 8 supported on the upper end portion of the front fork 6. The front fork 6 extends long along the axis 5. The vehicle 1 is made in lateral symmetry on either side of the axis 5 as seen in front view (FIG. 2).

The front fork 6 includes a pair of right and left fork tubes 11 extending parallel to the axis 5, an upper bracket 12 interconnecting the upper ends of the fork tubes 11, a lower bracket 13 interconnecting the lengthwise middle portions of the fork tubes 11, and a steering shaft (not shown) extending between the upper and lower brackets 12, 13. The steering shaft is inserted in and supported with the head pipe 4 to be turned about the axis 5. Thus, the front fork 6 is supported with the head pipe 4 of the vehicle body frame 3 so as to be steered as described above.

The vehicle 1 is provided with, as the components 16, a headlamp 17 projecting forward from the lower bracket 13 of the front fork 6 and a windshield 18 generally of a flat shape. The windshield 18 is located in the forward vicinity of the front fork 6 so as to cover the front sides of almost all the upper part of the front fork 6 and the handlebars 8.

In more concrete terms, the windshield 18 is provided with a shield main body 19 forming the upper part of the windshield 18 to cover from the front of the upper end portion of the front fork 6, above the headlamp 17, both side portions of the front fork 6 on right and left outer sides of the headlamp 17 and the handlebars 8, a pair of right and left protector plates 20 to cover from the front of both side portions of the front fork 6 below the headlamp 17 and the legs of the rider sitting astraddle on the vehicle 1 and a pair of metallic material-made brackets 21 attached to the outer rear sides of the shield main body 19 and the protector plates 20 so as to join the shield main body 19 and the protector plates 20 together into a single member. The upper end portions of the protector plates 20 are located in the rearward vicinity of the right and left side lower ends of the shield main body 19.

As for all the drawings, the vehicle 1 is provided with a pair of right and left locking device 24 for removably attaching the component 16 or the windshield 18 as shown with solid lines to the vehicle main body 2 or the front fork 6. The locking device 24 is made to be capable of attaching the windshield 18 to the front fork 6 as interlocked with the straight line motion of the windshield 18 in one direction A relative to the front fork 6.

The one direction A is made to be one direction along the flat outer surface of the windshield 18. Moreover, the one direction A is a direction that is down forward and also a direction along the axis 5 and the longitudinal direction of the front fork 6.

Each locking device 24 is provided with a locking mechanism 25 capable of attaching the windshield 18 to the vehicle main body 2 and an operation member 26 coupled to the locking mechanism 25. As shown with dash-and-dotted lines in FIG. 1, it is adapted that the attaching of the windshield 18 to the front fork 6 of the vehicle main body 2 is released by the operation made to the operation member 26.

As shown in FIG. 2 in particular, each locking device 24 is almost entirely covered with the windshield 18 from the front.

Each locking mechanism 25 is made up of a pair of upper and lower fitted portions 29 respectively provided to project to the outer side directions from the outer side faces of the fork tubes 11 constituting both side portions of the front fork 6, a pair of upper and lower fitting portions 30 formed on the rear surface side portion of the windshield 18 or the brackets 21 for removably fitting with each of the fitted portions 29 by back-and-forth motion of the windshield 18 in the one direction A, and a locking member 31 for attaching the windshield 18 to the front fork 6 by releasably locking the state of fitting of the fitting portion 30 to the fitted portion 29. In concrete terms, the locking member 31 locks the state of the fitting of the lower fitting portion 30 to the lower fitted portion 29, that is one of the upper and lower fitted portions 29.

Each fitted portion 29 is provided with a shaft member 34 projecting outward from the outer side face of the fork tube 11. The shaft member 34 is formed with a circumferential groove 35. Each fitting portion 30 is provided with a notch 37 formed in the bracket 21 and opens forward in the one direction A. In the fitting state of the fitting portion 30 to the fitted portion 29, it is adapted that, of the inner edge portions at the notch 37, both inner edge portions 38, 39 facing each other fit simultaneously to the circumferential groove 35.

The locking member 31 is made up of a hook 41 pivoted rotatably with a pivot shaft 40 on the bracket 21 for disengageably engaging with the inner surface of the circumferential groove 35 of the shaft member 34 fitting to the deepest portion of the notch 37 by the rotation, a spring 42 for urging (B) the hook 41 to engage with the inner surface of the circumferential groove 35 and a stopper 43 for preventing the hook 41 from turning beyond a specified angle in the direction of engaging with the inner surface of the circumferential groove 35. By the engagement of the hook 41 with the inner surface of the circumferential groove 35 of the fitted portion 29, the state of the fitting of each fitting portion 30 to each fitted portion 29 is locked. Thus, the windshield 18 is attached to the front fork 6 with the locking device 24.

Each operation member 26 is made in the shape of an operation lever as an integral part projecting from the hook 41 of the locking member 31 and rotatable along with the hook 41 about the pivot shaft 40. If the operation member 26 is handled to turn against the urging force of the spring 42, the hook 41 turns together with the operation member 26 to move away from the inner surface of the circumferential groove 35, so that the state of locking of the fitting portion 30 to the fitted portion 29 is released (dash-and-dotted lines in FIG. 1).

Figure 4:
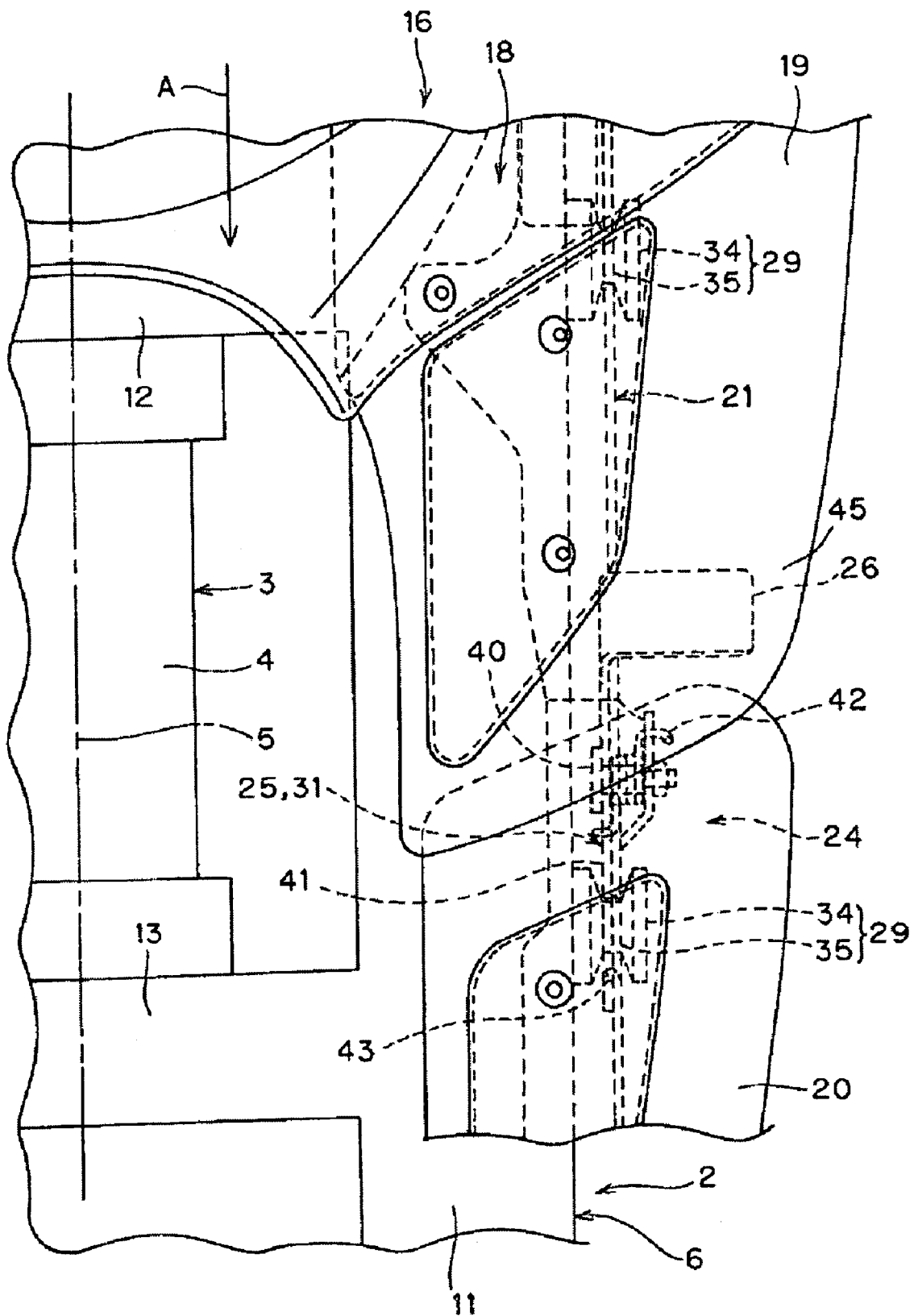
FIG. 4 is an enlarged partial detailed view of FIG. 2.
Figure 5:
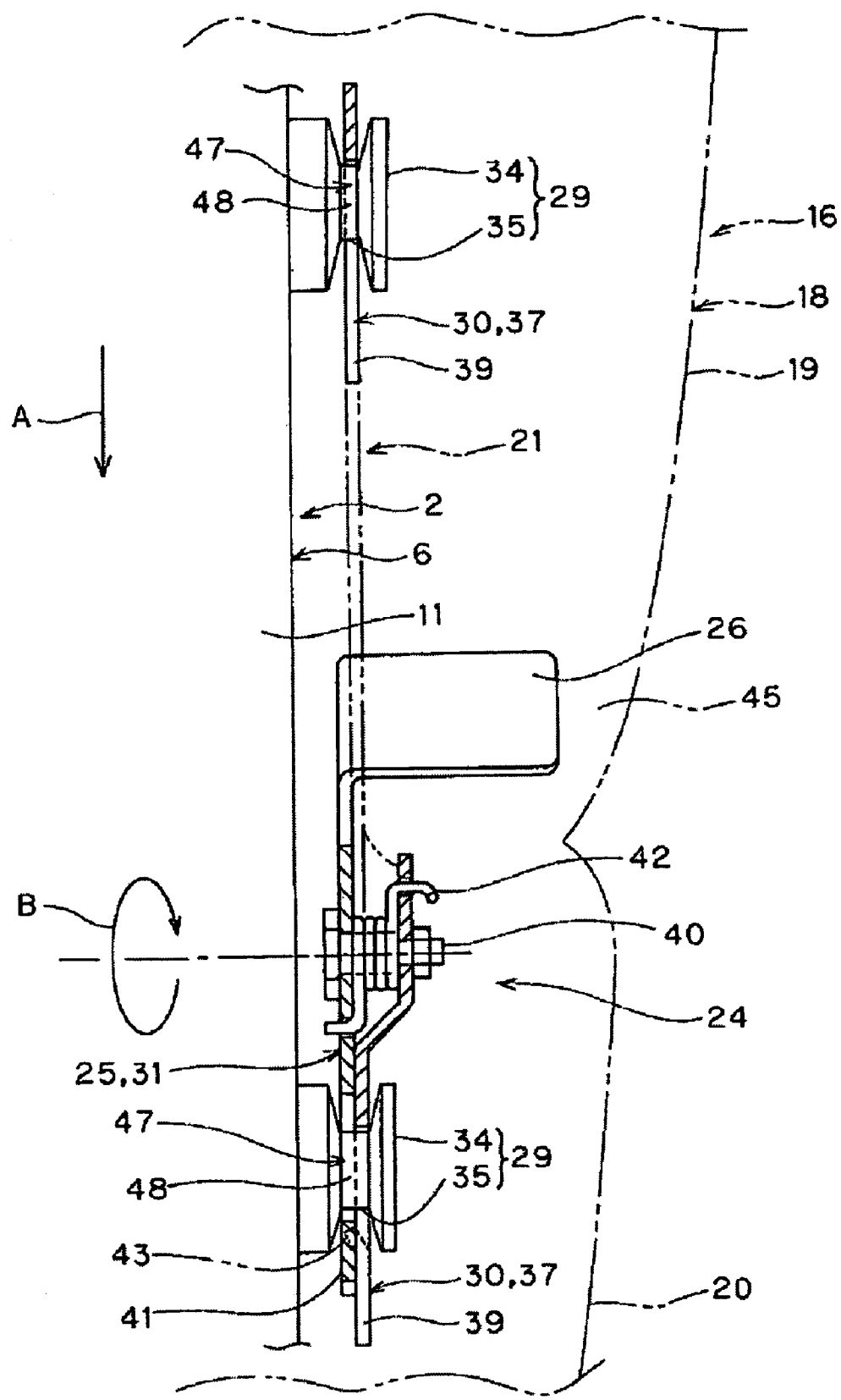
FIG. 5 is an enlarged partial sectional view of FIG. 4.

The outer edge portions 45 of the outer side portions of the windshield 18 can be gripped simultaneously by both hands from its front and can be lifted. The operation member 26 is located as overlapped on the outer edge portion 45 of the windshield 18 in front views of the windshield 18 (FIGS. 2 and 4). In other words, the operation member 26 is located behind the outer edge portion 45 of the windshield 18. The operation member 26 is located in the rear vicinity of each outer edge portion 45.

In front views of the component 16 (FIGS. 2 and 4), the outer end edge of the outer edge portion 45 of the component 16 in the vicinity of the operation member 26 is curved to surround the operation member 26 from outside the component 16. Due to the curve, the outer end edge of the outer edge portion 45 is made in an arcuate, convex shape facing outside. The outer end edge of the outer edge portion 45 is tilted to approach the center of the width of the component 16 of the vehicle 1 in a downward manner. The operation member 26 is adapted to move, as it turns, to and away from the outer edge portion 45 of the windshield 18 in the direction of the thickness of the windshield 18 (forward and backward). As described above, when locking with the hook 41 is released by operating the operation member 26, the operation member 26 moves to approach (C) the outer edge portion 45 of the windshield 18 in the direction of the thickness of the windshield 18 (forward and backward).

A guiding device 47 is provided to guide the windshield 18 so that it moves in the one direction A and that the locking device 24 makes interlocked motion with the motion in the one direction A and the windshield 18 can be attached to the front fork 6 with the locking device 24.

The guiding device 47 is made up of a pair of upper and lower slide receiving portions 48 formed on the front fork 6 of the vehicle main body 2 and a pair of upper and lower sliding portions 49 formed on the rear face of the bracket 21 of the windshield 18. The slide receiving portion 48 is formed with part of the inner bottom surface of the circumferential groove 35 of the fitted portion 29. On the other hand, of the inner edge portions 38, 39, of both notches 37, the inner edge portion 38 on the shield main body 19 side is extended in the one direction A. This extended portion forms the sliding portion 49.

When the sliding portion 49 is slid relative to the slide receiving portion 48, or the sliding portion 49 is slid with the inner edge portions 38, 39 of the notch 37 of each fitting portion 30 fitted to the circumferential groove 35 of each fitted portion 29, the windshield 18 is moved in the one direction A. The fit state of each fitting portion 30 to each fitted portion 29 can be locked with the locking member 31. In other words, the windshield 18 can be attached to the front fork 6 with the locking device 24.

An example of work for attaching the windshield 18 to the front fork 6 is described. First, the right and left outer edge portions 45 of the windshield 18 are gripped by both hands from the front side, and the windshield 18 is placed so that the fitting portions 30 are located rearward above the fitted portions 29 of the locking device 24. Next, each operation member 26 is operated with the index finger of the hand gripping each outer edge portion 45 so that the operation member 26 approaches (C) the outer edge portion 45 and the hook 41 of the locking member 31 opens the opening of the notch 37 (dash-and-dotted lines in FIG. 1).

Next, the windshield 18 is moved in the one direction A. At this time, each sliding portion 49 is brought into contact with each slide receiving portion 48 of the guiding device 47 and each sliding portion 49 is slid relative to each slide receiving portion 48. Then, the windshield 18 moves in the one direction A, so that the deepest portion of the notch 37 of each fitting portion 30 is made to fit to the circumferential groove 35 of each fitted portion 29 (solid lines and dash-and-dotted lines in FIG. 1).

Next, when the operation to the operation member 26 is removed, the hook 41 is urged with the spring 42 to engage with the inner bottom surface of the circumferential groove 35, the fitting state of each fitting portion 30 to each fitted portion 29 is locked with the locking member 31, and the windshield 18 is attached to the front fork 6 with locking device 24, so that the attaching work is finished.

On the other hand, when work is to be done for removing the windshield 18 from the front fork 6 by releasing the attaching of the windshield 18 to the front fork 6, the work may be done in the reverse order of the attaching work.

In the attaching work for the windshield 18, if the windshield 18 is guided with the guiding device 47 to move in the one direction A while the opening of the notch 37 is left closed with the hook 41 urged with the spring 42, along with the motion of the windshield 18 in the one direction A, the front end edge in the one direction A of the hook 41 comes into pressing contact with the inner bottom surface of the circumferential groove 35 of the fitted portion 29, is turned about the pivot shaft 40 while resisting the spring 42, so as to open the opening of the notch 37 (dash-and-dotted lines in FIG. 1).

From the above state, if the windshield 18 is further moved in the one direction A, along with the fitting of the deepest portion of the notch 37 to the inner bottom surface of the circumferential groove 35, the hook 41 is automatically urged with the spring 42 to engage with the inner bottom surface of the circumferential groove 35, and the state of each fitting portion 30 to each fitted portion 29 is locked with the locking member 31. In other words, the locking device 24 works as being interlocked with the motion of the windshield 18 in the one direction A, and the windshield 18 is attached automatically to the front fork 6 with the locking device 24 to finish the attaching work.

According to the above constitution, at the time of doing the work for attaching the component 16, the one direction A along which the component 16 is to be moved is made to be one along the flat outer surface of the component 16.

The one direction A, along which the component is moved when work is to be done for attaching the component 16 to the vehicle main body 2, is the one along the flat outer surface of the component 16. Therefore, a small space to be taken up with the component 16 suffices for the locus of motion of the component 16. Consequently, while components are generally laid out compactly in the vehicle 1 and only a small surplus space is left, in proportion to the extent the small space suffices for being taken up as described above, a small space also suffices for the attaching work. As a result, other components are prevented from standing in the way of doing the work for attaching the component 16, so that the work for attaching the component 16 is facilitated.

As described above, the one direction A is made to be one directed downward.

Therefore, the moving direction of the component 16 for attaching the component 16 nearly coincides with the direction of its own weight. Therefore, in comparison with a case in which the one direction A is one that is directed upward, the work for attaching the component 16 is made easier.

As described above, the locking device 24 is provided with a locking mechanism 25 capable of attaching the component 16 to the vehicle main body 2 and with the operation member 26 coupled to the locking mechanism 25. It is adapted that the attaching of the component 16 to the vehicle main body 2 with the locking device 24 is released by the operation made to the operation member 26. The operation member 26 is placed near the outer edge portion 45 of the component 16.

Therefore, the operation member 26 is prevented from projecting largely from the component 16, the component 16 and the operation member 26 are located to reduce the integrated size, and the vehicle 1 is prevented from becoming large-sized.

When work is done for removing the component 16, having been attached to the vehicle main body 2 with the locking device 24, from the vehicle main body 2, for example the outer edge portions 45 of the component 16 are gripped by hand and the operation member 26 is operated by fingers of the same hand. Then, it is possible to release the attaching of the component 16 to the vehicle main body 2 with the locking device 24. Therefore, the removal work of the component 16 is facilitated in comparison with a removal work in which holding the component 16 is done separately from operating the operation member 26 of the locking device 24.

As described above, in the front view of the component 16, the outer end edge of the outer edge portion 45 of the component 16 in the vicinity of the operation member 26 is curved to surround the operation member 26 from outside the component 16.

Therefore, the outer edge portion 45 of the component 16 near the operation member 26 with its curvature is shaped convex facing outward. Therefore, when the outer edge portion 45 of the component 16 near the operation member 26 is gripped by hand in an attempt to remove the component 16, having been attached to the vehicle main body 2 using the locking device 24, from the vehicle main body 2 by operating the locking device 24, at least part of the convex shaped portion of the outer edge portion 45 fits into the palm of the hand so that the component 16 is supported by the grip more securely. As a result, the work for removing the component 16 from the vehicle main body 2 is further facilitated.

As described above, in case that one direction A is directed in a downward manner, the outer end edge of the outer edge portion 45 of the component 16 in the vicinity of the operation member 26 is tilted to approach the center of the width of the component 16 of the vehicle 1 toward a downward direction.

Therefore, when the outer edge portion 45 of the component 16 in the vicinity of the operation member 26 is gripped in an attempt to remove the component 16 from the vehicle main body 2, the grip is done from under the outer edge portion 45. Therefore, the force for supporting the component 16 by the grip is to withstand the weight of the component 16. This makes supporting the component 16 more secure and accordingly the work for removing the component 16 from the vehicle main body 2 is further facilitated.

As described before, it is adapted that the operation member 26, when operated, moves (C) to approach the outer edge portion 45 of the component 16.

Therefore, when the work is performed for removing the component 16 from the vehicle main body 2, or when the operation member 26 of the locking device 24 is operated by fingers of the hand while gripping the outer edge portion 45 of the component 16, the operation may be done so that the operation member 26 moves to approach the outer edge portion 45. This operation, in view of the motion of fingers, is easier than a motion of the operation member 26 moving away from the outer edge portion 45, opposite the approaching motion (C). Accordingly the work for removing the component 16 is facilitated.

As described before, the guiding device 47 is provided to guide the component 16 so that the component 16 moves in the one direction A.

Therefore, during the attaching work for the component 16, moving the component 16 in the one direction A and attaching it to the vehicle main body 2 using the locking device 24 is facilitated with the function of the guiding device 47 for guiding the component 16. Accordingly the work for attaching the component 16 is further facilitated.

As described before, the guiding device 47 is provided with the slide receiving portion 48 formed on the vehicle main body 2 and with the sliding portion 49 formed on the component 16 and slidable relative to the slide receiving portion 48, adapted that the component 16 moves in the one direction A as the sliding portion 49 slides relative to the slide receiving portion 48.

Therefore, when the component 16 is to be moved in the one direction A for the component 16 attaching work, first, once the sliding portion 49 of the component 16 is brought into contact with the slide receiving portion 48 of the vehicle main body 2, the positioning of the component 16 to the vehicle body 2 is done very easily in the beginning of the attaching work. Next, once the sliding portion 49 is made to slide relative to the slide receiving portion 48, the component 16 moves in the one direction A and is attached to the vehicle main body 2 with the locking device 24. Therefore, because the work for attaching the component 16 can be made in simple steps of first bringing the sliding portion 49 into contact with the slide receiving portion 48 so that the component 16 is positioned on the vehicle main body 2 followed by sliding the sliding portion 49 relative to the slide receiving portion 48. Accordingly the work for attaching the component 16 is further facilitated.

As described before, the locking device 24 is almost entirely covered from the front with the component 16.

Therefore, the locking device 24 is prevented from being easily seen in appearance in the front view of the vehicle 1 by the component 16. Therefore, the appearance of the vehicle 1 is improved.

As described before, the vehicle 1 is one of a straddling type, the vehicle main body 2 is the vehicle body of the vehicle, and the component 16 is a windshield 18. It is adapted that the front fork 6 of the vehicle body is covered from the front with the windshield 18, the windshield 18 is attached to the front fork 6 with the locking device 24, and the one direction A is made to be a direction along the longitudinal direction of the front fork 6.

Therefore, the above effects are obtained with the straddling type of vehicle. The effects are especially beneficial to the straddling type of vehicle having the vehicle main body 2 having a long-sized front fork 6 and others and various other components such as a headlamp 17, all in a compact layout, with little surplus space left, and with much importance attached to its appearance.

While the above is based on the illustrated example, the vehicle 1 may be any straddling type of vehicle such as a motor-operated tricycle or a four-wheeled vehicle, or a motor vehicle or a boat. The component 16 includes turn signal lamps or the like. The one direction A may be vertically upward or downward. The outer edge portion 45 of the component 16 in the vicinity of the operation member 26 may be curved in the shape of an apex of a triangle.

The invention claimed is:

1. An assembly that is attachable to and removable from a front fork of a vehicle, comprising:
a component of a generally flat shape; and
a locking means that attaches the component to the front fork by moving the component in one direction relative to the front fork, wherein the one direction is along a flat outer surface of the component.

2. The assembly according to claim 1, wherein the one direction is a direction directed in a downward manner.

3. The assembly according to claim 1, wherein the locking means is provided with a locking mechanism for attaching the component to the front fork and with an operation member coupled to the locking mechanism and adapted such that attaching with the locking means is released by an operation made to the operation member, and the operation member is located in a vicinity of an outer edge portion of the component.

4. The assembly according to claim 3, wherein an outer end edge of the outer edge portion of the component in a vicinity of the operation member is curved in a front view of the component so that the outer end edge of the outer edge portion surrounds the operation member from outside the component.

5. The assembly according to claim 3, wherein the operation member, when operated, approaches the outer edge portion of the component.

6. The assembly according to claim 1, wherein a guiding means is provided to guide the component so that the component moves in the one direction.

7. The assembly according to claim 6, wherein the guiding means is provided with a slide receiving portion formed on the front fork and with a sliding portion formed on the component and slidable relative to the slide receiving portion and the component moves in the one direction as the sliding portion slides relative to the slide receiving portion to set the sliding portion in a notch of the slide receiving portion.

8. The assembly according to claim 1, wherein the locking means is almost entirely covered on its front side with the component.

9. The assembly according to claim 1, wherein the vehicle is one of a straddling type, the component is a windshield and the front fork is covered on its front side with the windshield and wherein the windshield is attached to the front fork with the locking means and the one direction is a direction along a longitudinal direction of the front fork.

10. An assembly that is attachable to and removable from a front fork of a vehicle, comprising:

a component of a generally flat shape; and a locking device capable of attaching the component to the front fork by moving the component in one direction relative to the front fork, wherein the one direction is along a flat outer surface of the component.

11. The assembly according to claim 10, wherein the one direction is a direction directed in a downward manner.

12. The assembly according to claim 10, wherein the locking device is provided with a locking mechanism for attaching the component to the front fork and with an operation member coupled to the locking mechanism and adapted such that attaching with the locking device is released by an operation made to the operation member, and the operation member is located in a vicinity of an outer edge portion of the component.

13. The assembly according to claim 12, wherein an outer end edge of the outer edge portion of the component in a vicinity of the operation member is curved in a front view of the component so that the outer end edge of the outer edge portion surrounds the operation member from outside the component.

14. The assembly according to claim 12, wherein the operation member, when operated, approaches the outer edge portion of the component.

15. The assembly according to claim 10, wherein a guiding device is provided to guide the component so that the component moves in the one direction.

16. The assembly according to claim 15, wherein the guiding device is provided with a slide receiving portion formed on the front fork and with a sliding portion formed on the component and slidable relative to the slide receiving portion and the component moves in the one direction as the sliding portion slides relative to the slide receiving portion to set the sliding portion in a notch of the slide receiving portion.

17. The assembly according to claim 10, wherein the locking device is almost entirely covered on its front side with the component.

* * * * *